H. FORSMAN.
HOSE PIPE COUPLING.
APPLICATION FILED MAR. 10, 1915.
1,169,389.
Patented Jan. 25, 1916.
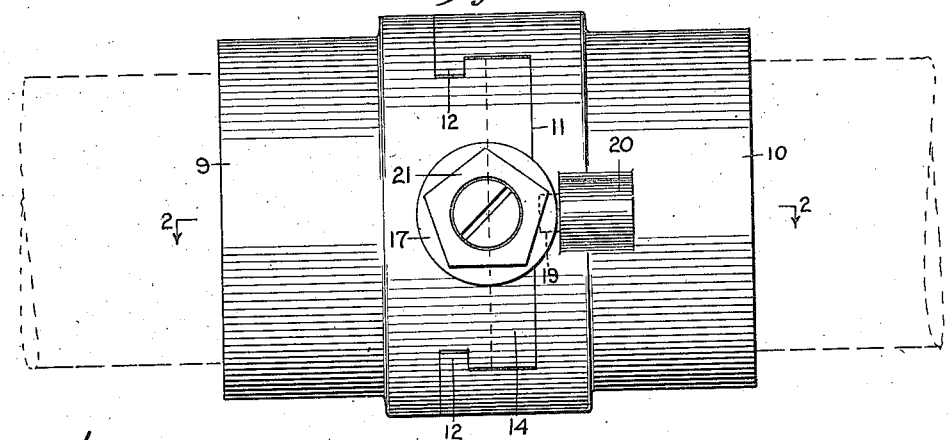
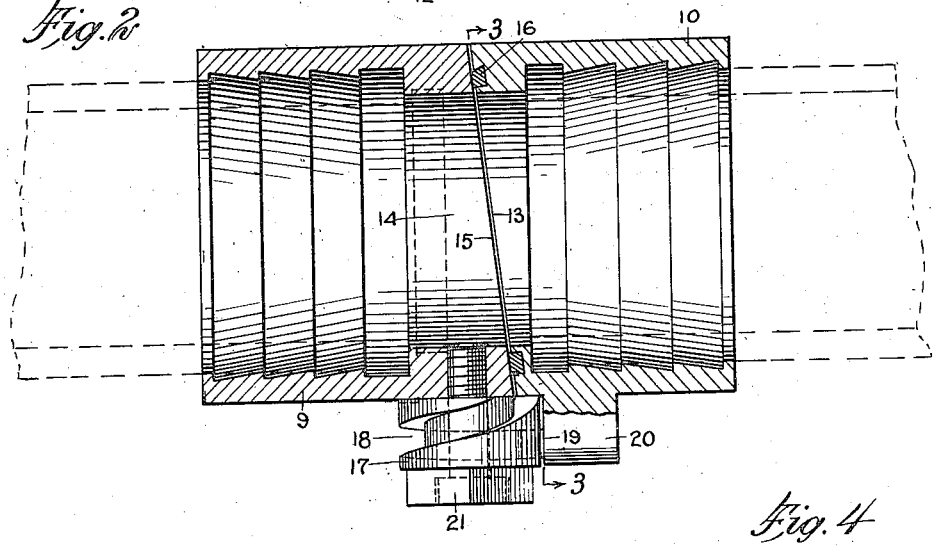
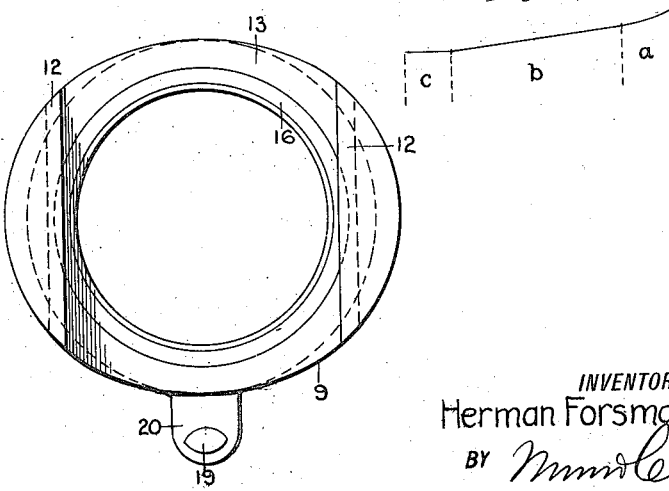
WITNESSES
INVENTOR
Herman Forsman
BY
ATTORNEYS

UNITED STATES PATENT OFFICE.

HERMAN FORSMAN, OF FRESNO, CALIFORNIA.

HOSE-PIPE COUPLING.

1,169,389.

Specification of Letters Patent.   Patented Jan. 25, 1916.

Application filed March 10, 1915. Serial No. 13,362.

*To all whom it may concern:*

Be it known that I, HERMAN FORSMAN, a citizen of the United States, and a resident of Fresno, in the county of Fresno and State of California, have invented a new and Improved Hose-Pipe Coupling, of which the following is a full, clear, and exact description.

Among the principal objects which the present invention has in view are: To provide means for rapidly and securely uniting hose sections; to provide means for locking said sections in united relation; to provide means for drawing the sections together to prevent leakage thereof; and to provide means for locking the sections in service relation.

*Drawings.*—Figure 1 is a top side view of a hose coupling constructed and arranged in accordance with the present invention; Fig. 2 is a longitudinal section taken on the line 2—2 in Fig. 1; Fig. 3 is an end view of a female member of a hose coupling; Fig. 4 is a diagrammatic view showing in platted arrangement the different angles of the sections of the groove in the locking nut.

*Description.*—As seen in the drawings, the coupling embodies a male member 9 and a female member 10. The member 10 has a transverse slot 11 formed therein, the side edges 12 whereof overhang in the manner best shown in Fig. 1 of the drawings. The face or sliding surface 13 of the slot 11 is inclined, as shown best in Fig. 2 of the drawings, forming at one end of said slot a relatively deep passage, and at the opposite end thereof a relatively shallow passage.

The member 9 has a dovetailed projection 14 extending from the end thereof, said projection corresponding with the slot 11, the surfaces 13 and 15 of the two members 9 and 10 being ground to form a water-tight joint when drawn together. To further insure the tightness of the joint, the member 10 is grooved to receive a packing ring 16, as best shown in Fig. 2 of the drawings.

When the members 9 and 10 are connected, the dovetailed projection 14 is forced tightly upon the packing ring 16, by the manipulation of a cam groove nut 17. The nut 17 is pivotally mounted in the member 9, and is provided with a cam slot 18. The slot 18 is preferably cut to form three pitch sections, as seen best in Fig. 4 of the drawings, where the section indicated by the letter *a* shows the sharp entrance incline with which the slot 18 is provided, while the section indicated by the letter *b* shows the even pitch, or what may be termed the drawing section, and the letter *c* a level section which serves to lock the nut 17 when said section *c* passes under a pin 19.

The pin 19 extends from the side of a lug 20 integrally formed with and offset from the member 10. The pin 19 is shaped for engagement with the slot 18 of the nut 17.

*Operation.*—Having coupling members constructed and equipped in the manner as described, the operation is as follows:— The members 9 and 10 are brought together in such a manner as to permit the introduction of the dovetailed projection 14 into the slot 11. The pin 19, being in the path of the nut 17, holds the surface 15 away from the surface 13 until said pin enters the slot 18. The sharp-pitched section *a* secures a rapid lengthwise travel of the nut 17 relative to said pin. When the under surface of the slot 18 begins to bear on the pin 19 a wrench is applied to the wrench head 21 of the nut 17, which is then turned until the pin 19 passes in the slot 18 to the level section corresponding with the section *c* in the diagram, Fig. 4. The engagement resulting from disposing the level portion of the slot 18 in the pin 19 secures the union from disengagement. The force which is applied to the nut 17 is sufficient to compress the ring 16 and to force the surfaces 13 and 15 into such engagement as to preclude the possibility of water, gas or steam passing the joint thus formed.

Claims:

1. A coupling as characterized, comprising a female member having a transverse slot, the side edges of said slot overhanging; a male member having a dovetailed projection for coöperating with said slot, said projection being cam-shaped to engage the overhanging edges, for drawing said male and female members into closer relation; an abutment mounted on one of said members adjacent the slot therein; and a screw pivotally mounted on the other member, the thread of said screw operatively engaging said abutment.

2. A coupling as characterized, comprising a female member having a transverse slot, the side edges of said slot overhanging; a male member having a dovetailed projection for coöperating with said slot, said projection being cam-shaped to engage the overhanging edges, for drawing said male and female members into closer relation; an abutment mounted on one of said members adjacent the slot therein; and a screw pivotally mounted on the other member, the thread of said screw operatively engaging said abutment, said screw having a level section at the end of the inclined portion thereof for holding said abutment in locked relation to said screw.

3. A coupling as characterized, comprising a female member; a male member, the former member having a transverse slot the sides whereof are undercut, and the latter member having a dovetailed projection the sides whereof correspond with the sides of said slot, the engaged faces of said slot and said projection being inclined to the axes of said members; a pin mounted on one of said members and extending through the other of said members; and a screw pivotally mounted on the other member for engaging said pin, to move said members lengthwise of the inclined faces thereof.

4. A coupling as characterized, comprising a female member; a male member, the former member having a transverse slot the sides whereof are undercut, and the latter member having a dovetailed projection the sides whereof correspond with the sides of said slot, the engaged faces of said slot and said projection being inclined to the axes of said members; a pin mounted on one of said members and extending through the other of said members; and a screw pivotally mounted on the other member for engaging said pin, to move said members lengthwise of the inclined faces thereof, the thread of said screw having a sharp entrance section, an evenly-pitched inclined section adjacent said entrance section, and a level section adjacent said inclined section for engaging said pin, for moving said male and female members into engagement with diminishing speed.

In testimony whereof I have signed my name to this specification in the presence of two subscribing witnesses.

HERMAN FORSMAN.

Witnesses:
   GEO. L. FLAGG,
   J. B. McLEES.